United States Patent
Spear et al.

(10) Patent No.: US 11,768,773 B2
(45) Date of Patent: Sep. 26, 2023

(54) I/O REQUEST TYPE SPECIFIC CACHE DIRECTORIES

(71) Applicant: INTERNATIONAL BUSINESS MACHINES CORPORATION, Armonk, NY (US)

(72) Inventors: Gail Spear, Tucson, AZ (US); Lokesh Mohan Gupta, Tucson, AZ (US); Kevin J. Ash, Tucson, AZ (US); Kyler A. Anderson, Sahuarita, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 196 days.

(21) Appl. No.: 16/808,309

(22) Filed: Mar. 3, 2020

(65) Prior Publication Data
US 2021/0279179 A1    Sep. 9, 2021

(51) Int. Cl.
  *G06F 12/08* (2016.01)
  *G06F 12/0871* (2016.01)
  *G06F 12/0817* (2016.01)
  *G06F 13/42* (2006.01)
  *G06F 12/0831* (2016.01)

(52) U.S. Cl.
  CPC ...... *G06F 12/0871* (2013.01); *G06F 12/0817* (2013.01); *G06F 12/0835* (2013.01); *G06F 13/423* (2013.01); *G06F 2212/1024* (2013.01)

(58) Field of Classification Search
  CPC ............. G06F 12/0871; G06F 12/0817; G06F 12/0835; G06F 13/423; G06F 2212/1024
  See application file for complete search history.

(56) References Cited

U.S. PATENT DOCUMENTS

| | | | |
|---|---|---|---|
| 5,437,022 A * | 7/1995 | Beardsley | G06F 11/1666 711/120 |
| 10,198,186 B2 | 2/2019 | Fang et al. | |
| 2006/0080506 A1 * | 4/2006 | Rajamony | G06F 12/084 711/119 |

(Continued)

OTHER PUBLICATIONS

J.G. Biondo Junior, et al., "Getting Started with IBM zHyperLink for z/OS", IBM Redbooks, REDP-5493-00, Jun. 2018, 118 pp.

(Continued)

*Primary Examiner* — Jae U Yu
(74) *Attorney, Agent, or Firm* — KONRAD RAYNES DAVDA & VICTOR LLP; William K. Konrad

(57) ABSTRACT

Provided are I/O request type specific cache directories in accordance with the present description. In one embodiment, by limiting track entries of a cache directory to a specific I/O request type, the size of the cache directory may be reduced as compared to general cache directories for I/O requests of all types, for example. As a result, look-up operations directed to such smaller size I/O request type specific cache directories may be completed in each directory more quickly. In addition, look-ups may frequently be successfully completed after a look-up of a single I/O request type specific cache directory, improving the speed of cache look-ups and providing a significant improvement in system performance. Other aspects and advantages are provided, depending upon the particular application.

15 Claims, 5 Drawing Sheets

(56) References Cited

U.S. PATENT DOCUMENTS

| | | | | |
|---|---|---|---|---|
| 2006/0179229 | A1* | 8/2006 | Clark | G06F 12/0811 |
| | | | | 711/129 |
| 2010/0115204 | A1* | 5/2010 | Li | G06F 12/0846 |
| | | | | 711/130 |
| 2012/0290786 | A1* | 11/2012 | Mesnier | G06F 12/0875 |
| | | | | 711/136 |
| 2016/0179674 | A1* | 6/2016 | Sury | G06F 12/0822 |
| | | | | 711/141 |
| 2017/0083447 | A1* | 3/2017 | Xu | G06F 12/123 |
| 2017/0109295 | A1 | 4/2017 | Lasperas et al. | |
| 2017/0286298 | A1 | 10/2017 | Geetha et al. | |
| 2018/0189182 | A1 | 7/2018 | Wang et al. | |

OTHER PUBLICATIONS

B. Dusfrasne, et al., "IBM DS8880 Architecture and Implementation", Release 8.5, IBM Redbooks, SG24-8323-04, Aug. 2018, 514 pp.
U.S. Appl. No. 16/206,115, filed Nov. 30, 2018, 39 pp.
U.S. Appl. No. 16/746,473, filed Jan. 17, 2020, 36 pp.

* cited by examiner

I/O REQUEST TYPE SPECIFIC CACHE DIRECTORIES

BACKGROUND

1. Field of the Invention

The present invention relates to a computer program product, computer system, and computer-implemented method for I/O request type specific cache directories in a data storage system.

2. Description of the Related Art

A storage system may control access to storage for one or more host computational devices that may be coupled to the storage system over a network. A storage management application that executes in the storage system may manage a plurality of storage devices, such as disk drives, tape drives, flash drives, direct access storage devices (DASD), etc., that are coupled to the storage system. A job executing on a host may send Input/Output (I/O) commands or requests to the storage system which executes the I/O requests to read data from the storage devices or write data to the storage devices. The storage system typically includes a storage controller which controls the storage devices.

A storage controller of a storage system may include two or more servers, where each server may be referred to as a node, a storage server, a processor complex, a Central Processor Complex (CPC), or a Central Electronics Complex (CEC). Each server may be included in a cluster. Each server may have a plurality of processor cores and the servers may share the workload of the storage system. In a two server configuration of the storage system referred to as a dual-server storage controller, either server can failover to the other if there is a failure or a planned downtime for one of the two servers.

A cache is a memory which typically provides faster access to data for input/output operations as compared to storage. Data to be read may be first staged into the cache from storage and then read directly from the cache instead of directly from the storage to provide faster access to read data. Conversely, data to be updated may be first updated in the cache and then destaged to storage which is typically non-volatile storage, that is, the data persists in the non-volatile storage notwithstanding a loss of power to the storage. By comparison, some or all of the cache memory may be volatile memory, that is, data may not persist in a volatile cache in the event of a power failure.

Storage systems typically employ a cache directory in the form of a table such as a hash table, for example, which may be used to determine whether a particular track has been cached in the cache. As described in copending application Ser. No. 16/748,656, filed Jan. 21, 2020 and entitled "Adaptive Caching in a Multi-tier Cache" storage systems may have a multi-tier cache which includes a relatively fast cache tier which may be implemented with DRAM memory, for example, and a relatively slower access cache tier which may be implemented with storage class memory (SCM), such as NAND type flash memory, for example. The slow cache tier of a multi-tier cache facilitates having a substantially larger memory capacity as compared to many known DRAM type only caches. Storage systems having a multi-tier cache of a DRAM type cache tier and a SCM type cache tier, may have two directories, one for the DRAM type cache tier and one for the SCM type cache tier.

There are several known types of I/O requests which may be sent by a host to the storage system. In one type, referred to herein as an "Application I/O" request, the storage system attempts to maintain two copies of the data while data is moving through the storage system in response to Application I/O requests transmitted by a host to the storage systems from applications executing on a host. The servers of the storage system have two areas of their primary memory that are used for holding host data: the aforementioned cache and also a non-volatile storage (NVS). NVS contains write data until the data is destaged from the cache to the storage drives. When a write is sent to a volume and both the servers are operational, the write data is placed into the cache of the owning server and into the NVS of the other server, where the owning server may be referred to as a cache node or CA node and the other server may be referred to as a NA node. The NVS copy of the write data may be accessed if a write failure occurs and the cache is empty or possibly invalid in the owning server. Otherwise, the NVS copy of the write data is discarded after destage operations from cache to the storage drives are complete.

Another known type of I/O request is a Synchronous I/O (Sync I/O) request which bypasses certain processes to reduce latency. For example, when an Application I/O request is executed by the storage system, several processes are performed to complete the I/O request and this affects the I/O latency. The I/O latency may be a significant part of application response time. ZHYPERLINK* (also referred to as zHyperLink) is a mechanism that is used to reduce the I/O latency by providing a fast, reliable, and direct communication path between a host and a storage controller. This goal is accomplished by installing zHyperLink adapters on the host and storage controller, and connecting the zHyperLink adapters by zHyperLink cables. This configuration creates point-to-point connection between the host and the storage controller and reduces the I/O response time in comparison to other mechanisms. Such low response time is achieved by using Synchronous I/O (Sync IO) requests, which reduce the time that is required for some functions, such as for I/O interrupts and dispatch times.

As noted above, processing of Application I/O requests generally requires I/O operations to perform a series of time-consuming tasks that include dispatching, interrupt handling, Central Processing Unit (CPU) queue time, CPU cache reload activities, etc. These tasks and other tasks that are required for Application I/O processing can cause the I/O response time to be relatively long compared to transferring data within virtual storage. When a Sync I/O request is performed, the CPU waits or "spins" until the I/O is completed, or the timeout value is reached. zHyperLink that uses Sync I/O may significantly reduce the time that is required to complete the Sync I/O because the dispatching, interrupt handling, CPU queue time, and CPU cache reload activities are no longer necessary. Further details of zHyperLink may be found in the publication "Getting Started with IBM zHyperLink for z/OS" published June 2018, by International Business Machines Corporation. Additional details of zHyperLink in the context of a storage controller may be found in the publication "IBM DS8880 Architecture and Implementation (Release 8.5)" published August 2018 by International Business Machines Corporation.

As noted above, storage systems frequently employ a cache directory in the form of a table such as a hash table, for example, which may be used to determine whether a particular track has been cached in the cache. However, long collision chains in the hash table can cause low latency requests such as Sync I/O requests to fail due to the timeout value being reached before the track of the Sync I/O request has been located in the hash table.

Another known type of I/O request is often referred to as a "Cache Fast Write (CFW)" I/O request which is typically used for sorting data in cache. Such sort jobs typically have the following characteristics: sequential writes followed by reads; data is temporary (i.e., CFW data is discarded by the host once the workload job is complete); and data loss is acceptable since any sort job that does not complete is re-started. Accordingly, unlike typical Application I/O requests, CFW I/O requests typically do not write a second copy of data to NVS. As described in copending application Ser. No. 16/746,473, filed Jan. 17, 2020 and entitled "Using a Memory Subsystem for a Workload Job", the host submits write operations for the sort job with an initial CFW Identifier (ID).

SUMMARY

In accordance with certain embodiments, a storage controller receives from a host, a first input/output (I/O) request of a first I/O request type and having a first I/O request type identification (ID) identifying the type of the first I/O request, wherein the first I/O request requests a first I/O operation directed to a first data unit. In response to receipt of the first I/O request, a first I/O request type specific cache directory is selected as a function of the first I/O request type ID wherein the first I/O request type specific cache directory indicates whether a particular data unit is stored in the cache and is limited to entries identifying data units cached in the cache for I/O requests of the first I/O request type. A first look-up is performed for the first data unit in the selected first I/O request type specific cache directory to determine if the first data unit is cached in the cache, and in response to the first data unit look-up successfully locating a first entry of the first I/O request type specific cache directory identifying the first data unit as cached in the cache, the requested first I/O operation of the received first I/O request is performed using the first data unit cached in the cache.

In another aspect, in response to the first data unit look-up failing to successfully locate an entry of the first I/O request type specific cache directory identifying the first data unit as cached in the cache, a second look-up for the first data unit in a second I/O request type specific cache directory is performed wherein the second I/O request type specific cache directory is limited to entries identifying data units cached in a cache for I/O requests of a second I/O request type. In response to the second data unit look-up successfully locating an entry of the second I/O request type specific cache directory identifying the first data unit as cached in the cache, the requested first I/O operation of the received first I/O request is performed using the first data unit cached in the cache. In addition, in one embodiment, in response to the second look-up successfully locating an entry of the second I/O request type specific cache directory identifying the first data unit as cached in the cache, the successfully located entry of the second I/O request type specific cache directory is moved to the first I/O request type specific cache directory.

In yet another aspect, in response to the second data unit look-up failing to successfully locate an entry of the second I/O request type specific cache directory identifying the first data unit as cached in the cache, the first data unit may be staged from storage so that the first data unit is cached into cache, an entry is created in the first I/O request type specific cache directory for the first data unit, and the requested first I/O operation of the received first I/O request is performed using the first data unit cached in the cache.

In one embodiment, the I/O request type of the first I/O request is a cache fast write (CFW) type I/O request, the first I/O request type ID is a CFW I/O request type ID, and the first I/O request type specific cache directory is limited to data units cached in association with I/O requests of the CFW I/O type. In another embodiment, the first I/O request is a Sync I/O type I/O request, the first I/O request type ID is a Sync I/O request type ID and the first I/O request type specific cache directory is limited to data units cached in association with I/O requests of the Sync I/O type, wherein in response to the first look-up successfully locating a first entry of the first I/O request type specific cache directory identifying the first data unit as cached in the cache, the requested Sync I/O request is performed using the first data unit cached in the cache. In addition, in response to the first data unit look-up failing to successfully locate an entry of the first I/O request type specific cache directory identifying the first data unit as cached in the cache, the first I/O request of the Sync I/O type is failed instead of being performed.

BRIEF DESCRIPTION OF THE SEVERAL VIEWS OF THE DRAWINGS

In the drawings, like reference numbers represent corresponding parts throughout.

DETAILED DESCRIPTION

Figure 1:
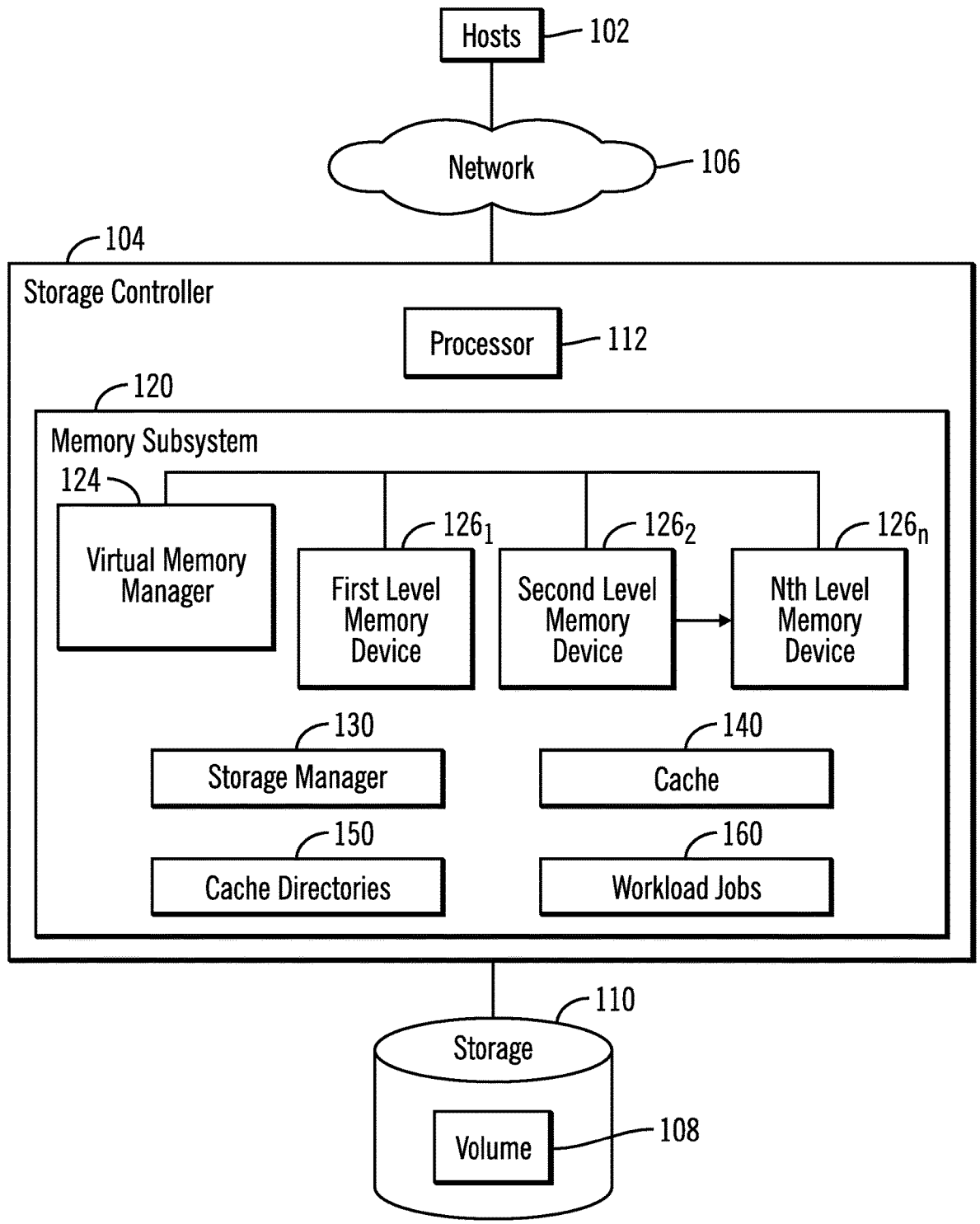
FIG. 1 illustrates, in a block diagram, a computing environment employing I/O request type specific cache directories in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one aspect of I/O request type specific cache directories in accordance with the present description, by limiting track entries of a cache directory for all cache to a specific I/O request type, the size of the cache directory may be reduced as compared to general cache directories for I/O requests of all types, for example. In one example, by limiting track entries of a cache directory to the specific CFW type I/O request, the size of a CFW specific cache directory may be reduced as compared to general cache directories for I/O requests of all types. As a result, a look-up of an I/O request type specific cache directory may often be performed more quickly as compared to general cache directories for I/O requests of all types, for example. Similar reductions in cache directory size and increases in cache look-up speed may be achieved for other I/O request type specific cache directories such as a Sync I/O specific cache directory and an Application I/O specific cache directory, for example. In this manner, significant improvements in system performance are provided.

In another aspect of I/O request type specific cache directories in accordance with the present description, it is appreciated that I/O requests of a particular type frequently are directed to a separate set of tracks or volumes as compared to tracks or volumes for other types of I/O requests. Thus, if a look-up of a cache directory results in a hit, it is believed that such a hit is more likely to result from a look-up of a single cache directory specific to that I/O request type, obviating look-ups directed to other cache directories for other I/O request types. As a result, look-ups may frequently be limited to a look-up of a single I/O request type specific cache directory, improving the speed of cache look-ups and providing a significant improvement in system performance.

In this manner, I/O request type specific cache directories in accordance with the present description, improve the efficiency of the computer system including increasing the speed of successful cache directory look-up operations. Other aspects and advantages may be realized, depending upon the particular application.

The present specification provides specific examples of I/O request types for which I/O request type specific cache directories in accordance with the present description, may be utilized. However, it is appreciated that I/O request type specific cache directories in accordance with the present description, may be utilized with other types of I/O requests, depending upon the particular application.

For example, in addition to CFW I/O requests directed to a sort job, it is appreciated that a merge job or a join job may also be suitable types of I/O requests to have an associated I/O request type specific cache directory. Other suitable I/O request types may include workload jobs having various distinguishing characteristics such as sequential writes followed by reads; the data is temporary (e.g., the data may be discarded by the host once the workload job is complete); or data loss is acceptable since a workload job that does not complete may be re-started. In certain embodiments, a workload job type having an associated I/O request type specific cache directory may be one where data is written infrequently and sequentially, where the data is read many times, or where the data may be thrown out when the workload job is re-started. For example, such workload jobs may include merge jobs or join jobs.

The present specification also provides Sync I/O requests as a specific example of I/O request types for which I/O request type specific cache directories in accordance with the present description, may be utilized. Sync I/O (also referred to as Synchronous I/O) comprises in general an attachment hardware and protocol for computational devices. Sync I/O has distinguishing characteristics which include very low latency random reads and small block sequential writes. Sync I/O connections between computational devices may be over point to point optical Peripheral Component Interconnect Express (PCIe) interfaces, for example. Sync I/O operations typically behave differently than traditional Application I/O requests in that in Sync I/O, a host computational device may hold an application thread in a spin loop while waiting for the I/O operation to complete. This avoids the need for processor cycles to perform the two context swaps of traditional I/O, the need to perform operations for putting the I/O thread to sleep and then re-dispatching the I/O thread, and the need for an I/O interrupt. Sync I/O operations may be performed by a Sync I/O process and may correspond to a high speed data transfer process from a host to a storage controller. Sync I/O writes may be referred to as zHyperLink (ZHL) writes.

For Sync I/O, writes from the host are split to a first node [e.g., the cache (CA) node] of the storage controller and a second node [e.g. the protected NVS node referred to as NA node] of the storage controller. Each individual write is performed on a specific track. Once the write has successfully completed on each of the CA and NA nodes, the write itself is considered successful.

zHyperLink that uses Sync I/O may significantly reduce the time that is required to complete the Sync I/O because the dispatching, interrupt handling, CPU queue time, and CPU cache reload activities are no longer necessary. In addition to Sync I/O requests, other suitable types of I/O requests having an associated I/O request type specific cache directory may include I/O requests which bypass various processes to reduce latency, and other low latency I/O requests. It is appreciated that other suitable types of I/O requests which may benefit from having an associated I/O request type specific cache directory may have other distinguishing characteristics, depending upon the particular application.

A system of one or more computers may be configured for I/O request type specific cache directories in accordance with the present description, by virtue of having software, firmware, hardware, or a combination of them installed on the system that in operation causes or cause the system to perform with I/O request type specific cache directories in accordance with the present description. For example, one or more computer programs may be configured to perform with I/O request type specific cache directories by virtue of including instructions that, when executed by data processing apparatus such as for example a storage controller processor, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable program code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Figure 2:
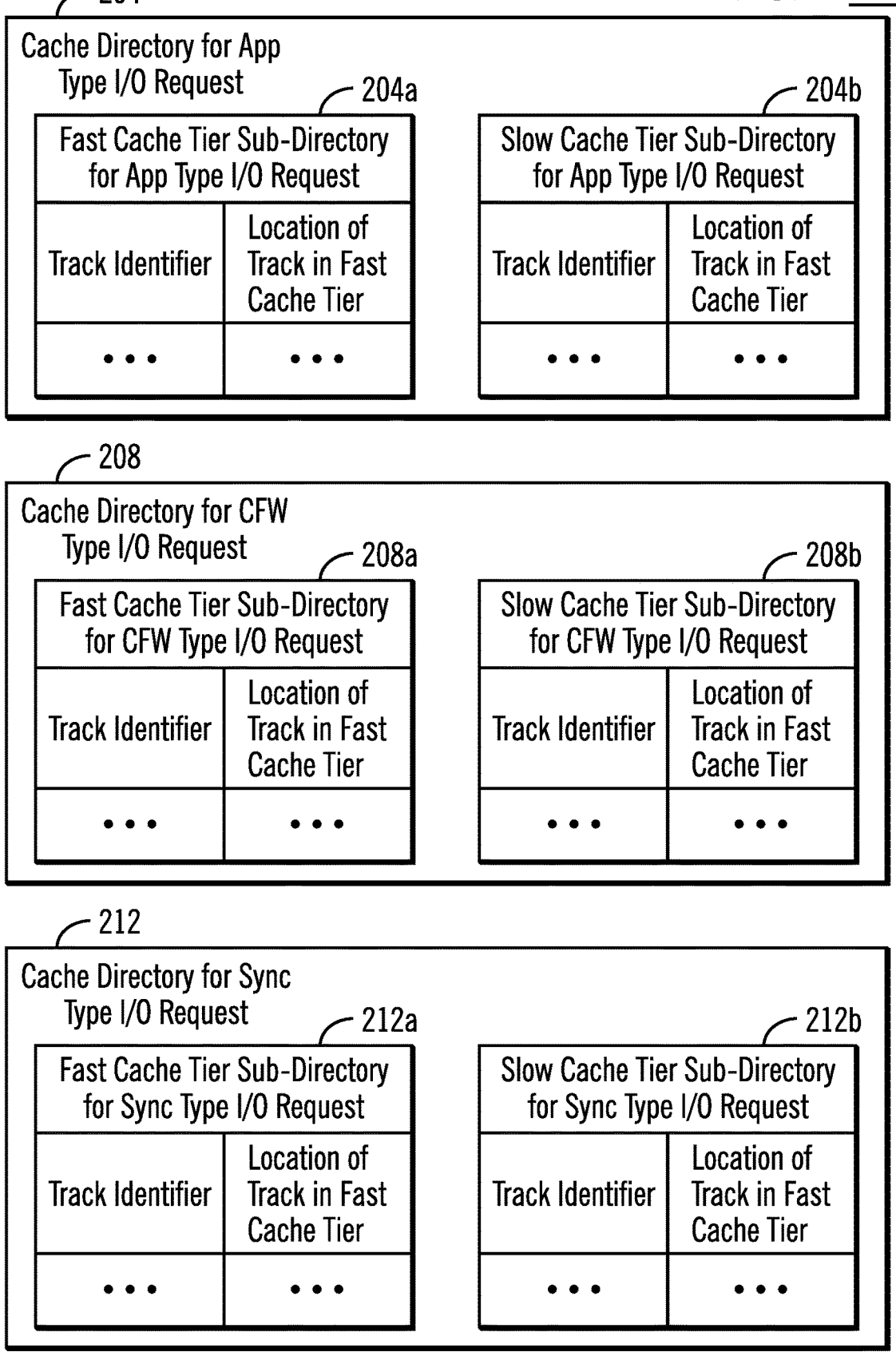
FIG. 2 illustrates examples of cache directories which are I/O request type specific for various types of I/O requests in accordance with certain embodiments.

FIGS. 1-2 illustrate an embodiment of a computing environment employing I/O request type specific cache directories in a data storage system in accordance with the present description. A plurality of hosts 102 (FIG. 1) may submit Input/Output (I/O) requests to a storage controller 104 over a network 106 to access data at volumes 108 (e.g., Logical Unit Numbers, Logical Devices, Logical Subsystems, etc.) in a tangible storage 110. The storage controller 104 includes one or more processors 112 and a computer readable memory subsystem 120, such as a Storage Class Memory (SCM) system, having a virtual memory manager 124 to manage the placement of tracks of data in one of a plurality of memory devices, such as a first level memory device $126_1$, a second level memory device $126_2$, through an nth level memory device $126_n$. The virtual memory manager 124 may maintain address translation tables to provide translation services and map tracks in the volumes 108 to physical or logical locations in the memory devices $126_1 \ldots 126_n$. The virtual memory manager 124 may further include algorithms to perform wear leveling to distribute write operations to different memory devices $126_1 \ldots 126_n$ and different locations within the memory devices, such as solid state storage devices (SSDs) or flash memory, that have a limited number of erase cycles to increase the life span of these lower level memory devices $126_1 \ldots 126_n$. In certain embodiments, the memory subsystem 120 comprising the virtual memory manager 124 and level memory devices $126_1 \ldots 126_n$ may function as another cache for the storage controller 104 or other computing device.

The storage controller 104 also includes a storage manager 130, a cache 140 (e.g., a DRAM cache, NAND cache, multi-tier cache, etc.), cache directories 150, and workload jobs 160 including applications for issuing I/O requests. The storage manager 130 may move tracks between the cache 140 and the memory subsystem 120 or between the cache 140 and the storage 110. In certain embodiments, the storage manager 130 works with the virtual memory manager 124 to move tracks between the cache 140 and the memory subsystem 120, with the virtual memory manager 124 determining which storage device $126_1 \ldots 126_n$ is to store data for the track.

In the illustrated embodiment, the storage manager 130 of the storage controller 104, is depicted as software stored in a memory and executed by the processor 112. However, it is appreciated that the logic functions of the storage manager 130 including I/O request type specific cache directories logic functions, may be implemented as hardware, software, firmware or any combination of one or more thereof, depending upon the particular application. In addition, logic functions of I/O request type specific cache directories may be implemented in a host or storage in addition to or instead of a storage controller.

The processor 112, the virtual memory manager 124, the memory devices $126_1 \ldots 126_n$, the storage manager 130, the cache 140, the cache directories 150, and the workload jobs 160 may communicate over one or more bus interfaces. Further, the virtual memory manager 124 may communicate over different types and separate bus and device interfaces for different of the memory devices $126_1 \ldots 126_n$. For instance, a local memory interface may be used to communicate with the first level memory device $126_1$, such as for a DRAM, and a storage device interface may be used to communicate with the lower level memory devices $126_2 \ldots 126_n$, such as Non-Volatile Memory Express (NVME) to communicate with flash memory and SSDs.

In certain embodiments, the first level memory device $126_1$ may comprise a high cost and very low latency device such as a Dynamic Random Access Memory (DRAM) or Static Random Access Memory (SRAM), and the lower level memory devices $126_2 \ldots 126_n$ may comprise less expensive and higher latency and higher capacity storage devices such as non-volatile random access memory (NVRAM), including Magnetoresistive Random Access Memory (MRAM), Phase Change Memory (PCM), Resistive Random Access Memory (RRAM), spin transfer torque memory (STM-RAM), conductive bridging RAM (CBRAM), NAND memory devices, such as flash memory and solid state drives (SSDs), etc. In certain embodiments, the lower level memory devices $126_2 \ldots 126_n$ may have different endurance profiles with different number of available erase cycles, such that higher level of the memory devices $126_2 \ldots 126_n$, allow for a greater number of erase cycles, i.e., greater endurance, than the lower level of the memory devices $126_2 \ldots 126_n$. For instance, lower level memory device $126_i$ may have a greater endurance, i.e., higher number of erase cycles, than lower level memory device $126_j$, where i<j. There may be one or more lower level memory devices $126_i$.

The virtual memory manager 124 may comprise a separate processing or hardware device implemented as microcode or firmware in hardware devices in the storage controller 104, such as in Application Specific Integrated Circuits (ASICs). Alternatively, the virtual memory manager 124 may comprise a system having a processor executing code loaded into a memory device. Still further, the virtual memory manager 124 may be implemented as code loaded into the first level memory device $126_1$ and executed by the processor 112.

The storage 110 may comprise one or more storage devices known in the art, such as a solid state storage device (SSD), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The storage devices of the storage 110 may be configured to store data in units or subunits of data storage such as tracks, extents, blocks, pages, segments, cylinders, volumes, etc. Although I/O request type specific cache directories in accordance with the present description are described in connection with storage units such as tracks, it is appreciated that adaptive caching in a multi-tier cache in accordance with the present description is applicable to other storage units and subunits such as sectors, cylinders, volumes, extents, blocks, pages, segments, etc.

The network 106 may comprise a Storage Area Network (SAN), a Local Area Network (LAN), a Wide Area Network (WAN), the Internet, and Intranet, etc. Alternatively, the hosts 102 may connect to the storage controller 104 over a bus interface, such as a Peripheral Component Interconnect (PCI) bus interface and other interfaces known in the art.

In one aspect of the present description, the cache directories 150 include different cache directories for different types of I/O requests and their associated tracks cached in the cache 140. For example, as shown in FIG. 2, the cache directories 150 include a cache directory 204 for tracks cached in all cache for Application type I/O requests, a cache directory 208 for tracks cached in all cache for CFW type I/O requests and a cache directory 212 for tracks cached in all cache for Sync type I/O requests. In this example, each entry of the cache directories 204, 208, 212 for each I/O request type, includes a track identifier and the location of that track in the cache 140. In certain embodiments, each track has a track identifier, and the host 102 submits I/O requests to read or write a track by providing the track identifier.

In one embodiment, the cache 140 (FIG. 1) is a multi-tier cache having a relatively fast cache tier of DRAM type memory, for example, and a relatively slow cache tier of NAND type memory, for example. In such embodiments having a multi-tier cache, each cache directory for the tracks of a particular I/O request type, may include a sub-directory for each tier. Thus, the cache directory 204 for tracks cached in all cache for Application type I/O requests may include a sub-directory 204a for tracks cached in the fast cache tier of the cache 140 for Application type I/O requests, and a sub-directory 204b for tracks cached in the slow cache tier of the cache 140 for Application type I/O requests. In a similar manner, the cache directory 208 for tracks cached in all cache for CFW type I/O requests may include a sub-directory 208a for tracks cached in the fast cache tier of the cache 140 for CFW type I/O requests, and a sub-directory 208b for tracks cached in the slow cache tier of the cache 140 for CFW type I/O requests. Also, the cache directory 212 for tracks cached in all cache for Sync type I/O requests may include a sub-directory 212a for tracks cached in the fast cache tier of the cache 140 for Sync type I/O requests, and a sub-directory 212b for tracks cached in the slow cache tier of the cache 140 for Sync type I/O requests. In this example, each entry of the cache sub-directories 204a, 204b, 208a, 208b, 212a, 212b for each I/O request type, includes a track identifier and the location of that track in the cache 140.

Figure 3:
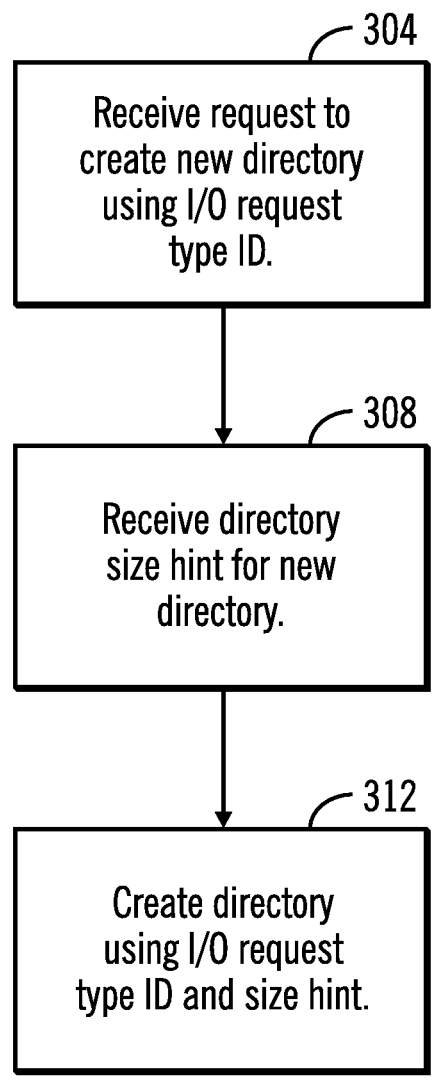
FIG. 3 illustrates, in a flowchart, operations for creating an I/O request type specific cache directory in accordance with certain embodiments.

FIG. 3 depicts an example of operations of the storage manager 130 for creating I/O request type specific cache directories in accordance with the present description. The storage manager 130 is configured to perform the operations depicted in FIG. 3 using suitable software, hardware, firmware or combinations thereof. In this embodiment, a host 102 (FIG. 1) issues to the storage controller 104 an identification (ID) in the form of data, which identifies a particular type of I/O request for which a cache directory is to be created. Associated with the I/O request type ID, is a "hint" in the form of data which identifies the expected size of the requested I/O request type directory such as small, medium, or large, for example.

The storage manager 130 (FIG. 1) receives (block 304, FIG. 3) from a host 102, a request to generate a new directory for a particular type of I/O request as identified by an I/O request type ID. The storage manager 130 also receives (block 308, FIG. 3) the hint identifying the expected size of the requested I/O request type directory. In response, the storage manager 130 creates (block 312, FIG. 3) the requested directory for the identified I/O request type and of the indicated size. For example, the cache directory 204 (FIG. 2) may be created for tracks cached for Application type I/O requests, the cache directory 208 may be created for tracks cached for CFW type I/O requests and the cache directory 212 may be created for tracks cached for Sync type I/O requests. It is appreciated that in one embodiment, the size of an Application I/O type specific cache directory 204 (FIG. 2) may vary among small, medium and large, for example, whereas the sizes of a CFW I/O type specific cache directory 208 or a Sync I/O type specific cache directory 212 may tend to be large, depending upon the particular application.

In one embodiment, a host 102 may issue an explicit request to generate a new directory for a particular type of I/O request prior to starting I/O requests of that type. Alternatively, the storage manager 130 may issue an implied request to generate a new directory for a particular type of I/O request by sending an I/O request of a type not previously sent. The storage manager 130 may be configured to recognize that a received I/O request is of a new type for which a directory has not yet been generated and proceed to create the directory for that I/O request type using a default I/O request type ID for the I/O request type. In one embodiment, the storage manager may create directories of various default sizes if not specified by the host, depending upon the particular I/O request type.

Figure 4:
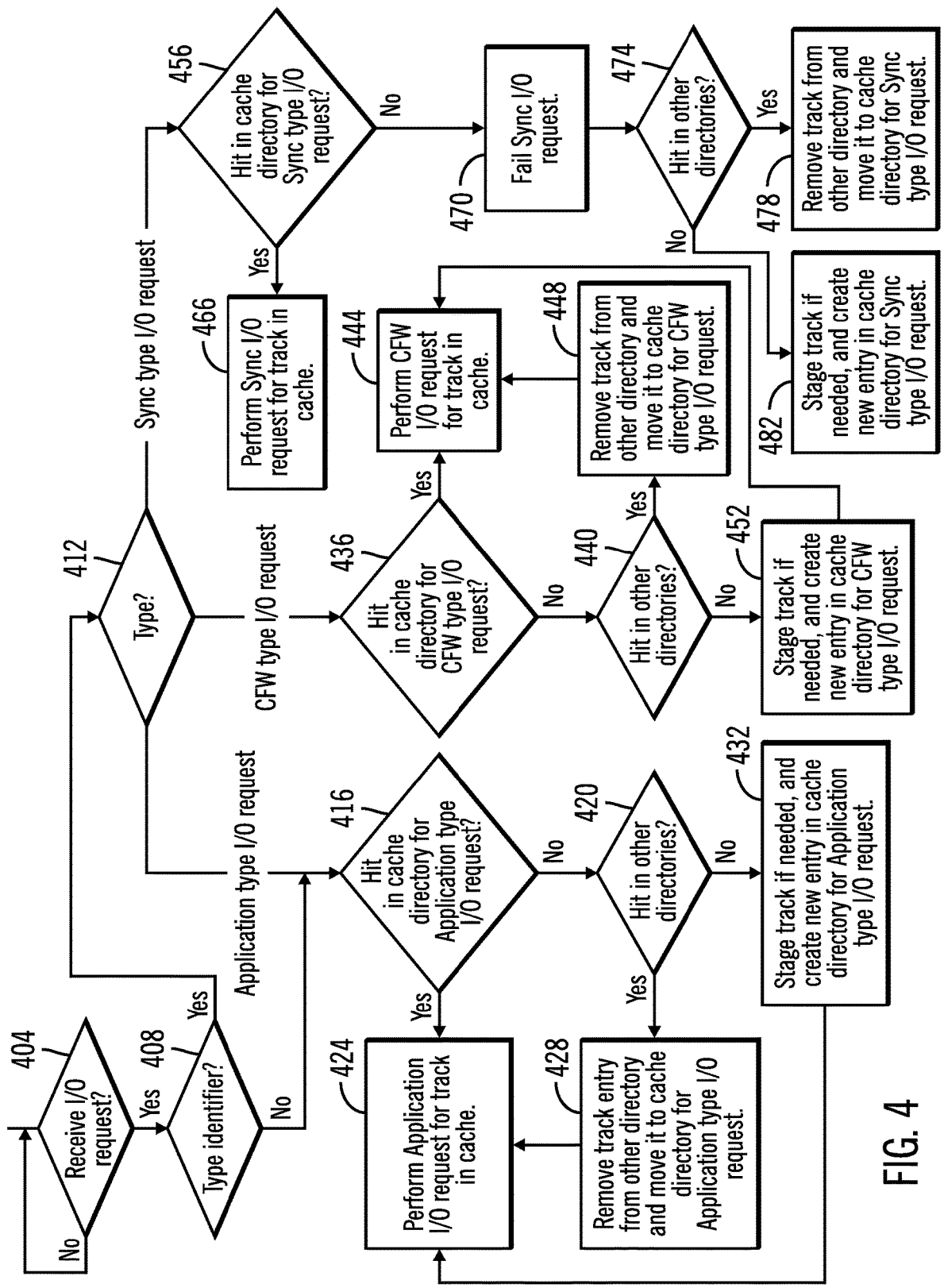
FIG. 4 illustrates, in a flowchart, operations for look-ups in I/O request type specific cache directories in accordance with certain embodiments.

FIG. 4 depicts an example of operations of the storage manager 130 for performing cache directory look-ups in a storage system employing I/O request type specific cache directories in accordance with the present description. The storage manager 130 is configured to perform the operations depicted in FIG. 4 using suitable software, hardware, firmware or combinations thereof. In this embodiment, upon receipt (block 404, FIG. 4) of an I/O request from a host 102 (FIG. 1) which may be a read request or a write request, the storage manager 130 determines (block 408, FIG. 4) whether the I/O request is accompanied by or otherwise associated with an I/O request type ID from the host which identifies the type of the I/O request being issued to the storage controller by the host. For example, a read request may be accompanied by an I/O request ID which identifies the read request as a CFW type I/O request. Accordingly, a determination is made (block 412, FIG. 4) to identify the type of the received I/O request as a function of the associated I/O request type ID.

If it is determined that the received read or write I/O request is of the application I/O type, a look-up of the cache directory 204 (FIG. 2) for application type I/O requests is made to determine (block 416, FIG. 4) if the cache directory 204 has an entry for the particular track or tracks to which the received I/O request is directed. As previously noted, in one embodiment, the host 102 submits I/O requests to read or modify a track by providing the track identifier of the track or tracks to be read from or modified. The cache directory 204 includes a track identifier and the location of that track in the cache 140 for tracks associated with application type I/O requests. By inspecting the hash table for cache directory 204, a determination (block 416, FIG. 4) is made as to whether the cache directory 204 has an entry for the particular track identifier provided by the host, that is whether the look-up has a hit, or whether the cache directory 204 lacks an entry for the particular track identifier provided by the host, that is whether the look-up has a miss. In those embodiments having a multi-tier cache such as a fast cache tier and a slow cache tier, for example, the hash table for cache sub-directory 204a may be inspected and if there is no hit, the hash table for the cache sub-directory 204b may be inspected, to determine if the look-up of the cache directory 204 for application type I/O requests has a hit or a miss.

In one aspect of I/O request type specific cache directories in accordance with the present description, by limiting track entries of a cache directory to a specific I/O request type, the size of the cache directory may be reduced as compared to general cache directories for I/O requests of all types, for example. As a result, a look-up of an I/O request type specific cache directory may often be performed more quickly as compared to general cache directories for I/O requests of all types, for example. In this manner, a significant improvement in system performance is provided.

In the event that the look-up of the cache directory 204 (FIG. 2) for application type I/O requests is determined (block 416, FIG. 4) to be a miss, that is, the cache directory 204 lacks an entry for the particular track or tracks to which the received I/O request is directed, the other cache directories (such as the cache directories 208, 212 (FIG. 2) may be searched (block 420, FIG. 4) for an entry directed to the particular track identifier. However, in another aspect of I/O request type specific cache directories in accordance with the present description, it is appreciated that I/O requests of a particular type frequently are directed to a separate set of tracks or volumes as compared to tracks or volumes for other types of I/O requests. Thus, if a look-up of a cache directory results in a hit, it is believed that such a hit is more likely to result from a look-up of a single cache directory specific to that I/O request type, obviating look-ups directed to other cache directories for other I/O request types. As a result, look-ups may frequently be successfully concluded after a look-up of a single I/O request type specific cache directory, improving the speed of cache look-ups and providing a significant improvement in system performance.

If the look-up of the cache directory 204 (FIG. 2) for application type I/O requests is determined (block 416, FIG. 4) to be a hit, that is, the cache directory 204 has an entry for the particular track or tracks identified by the track identifier to which the received I/O request is directed, the application I/O request may be performed (block 424, FIG. 4) by directing a read or write operation of the application I/O request to the track or tracks at the cache memory location identified by the entry of the cache directory 204 having the track identifier of the application I/O request from the host. Conversely, if the look-up of the cache directory 204 (FIG. 2) for application type I/O requests is determined (block 416, FIG. 4) to be a miss but one of the look-ups directed to the other cache directories 208, 212 (FIG. 2) for other types of I/O requests is determined (block 420, FIG. 4) to be a hit, that is, one of the other cache directories 208, 212 has an entry for the particular track or tracks identified by the track identifier to which the received I/O request is directed, the hit track entry may be moved (block 428, FIG. 4) from the other directory 208, 212 (FIG. 2) and to the cache directory 204 for the I/O request application type. In addition, the application I/O request may be performed (block 424, FIG. 4) by directing a read or write operation of the application I/O request to the track or tracks at the cache memory location identified by the entry moved to the cache directory 204 having the track identifier of the application I/O request from the host.

If both of the look-ups directed to the other cache directories 208, 212 (FIG. 2) for other types of I/O requests are determined (block 420, FIG. 4) to be a miss, that is, neither of the other cache directories 208, 212 has an entry for the particular track or tracks identified by the track identifier to which the received I/O request is directed, the track or tracks identified by the track identifier of the application I/O request may be staged (block 432, FIG. 4) in to cache if the application I/O request is a read operation or is an update write operation to partially modify preexisting write data stored in storage. In addition, a new entry may be created in the cache directory 204 for the track or tracks identified by the I/O request application type. Also, the application I/O request may be performed (block 424, FIG. 4) by directing a read or write operation of the application I/O request to the cache memory location identified by the entry created in the cache directory 204 for the track identifier of the application I/O request from the host.

If it is determined that the received I/O request (which may be a read operation, for example) is of the CFW type, a look-up of the cache directory 208 (FIG. 2) for CFW type I/O requests is made to determine (block 436, FIG. 4) if the cache directory 208 has an entry for the particular track or tracks to which the received I/O request is directed. As previously noted, in one embodiment, the host 102 submits I/O requests to read or modify a track by providing the track identifier of the track or tracks to be read from or written to. Each entry of the cache directory 208 includes a track identifier and the location of that track in the cache 140 for tracks associated with CFW type I/O requests. By inspecting the hash table for cache directory 208, a determination (block 436, FIG. 4) is made as to whether the cache directory 208 has an entry for the particular track identifier provided by the host, that is whether the look-up encounters a hit, or whether the cache directory 208 lacks an entry for the particular track identifier provided by the host, that is whether the look-up encounters a miss. In those embodiments having a multi-tier cache such as a fast cache tier and a slow cache tier, for example, the hash table for cache sub-directory 208a may be inspected and if there is no hit, the hash table for the cache sub-directory 208b may be inspected, to determine if the look-up of the cache directory 208 for CFW type I/O requests has a hit or a miss.

Here too, by limiting track entries of the cache directory 208 to the specific I/O request CFW type, the size of the cache directory 208 may be reduced as compared to general cache directories for I/O requests of all types, for example. As a result, a look-up of the CFW I/O request type specific cache directory 208 may often be performed more quickly as compared to general cache directories for I/O requests of all types, for example. In this manner, a significant improvement in system performance is provided.

In the event that the look-up of the cache directory 208 (FIG. 2) for CFW type I/O requests is determined (block 436, FIG. 4) to be a miss, that is, it is determined that the cache directory 208 lacks an entry for the particular track or tracks to which the received I/O request is directed, the other cache directories (such as the cache directories 204, 212 (FIG. 2) may be searched (block 440, FIG. 4) for an entry directed to the particular track identifier. However, in another aspect of I/O request type specific cache directories in accordance with the present description, it is appreciated that I/O requests of the CFW type frequently are directed to a separate set of tracks or volumes as compared to tracks or volumes for other types of I/O requests. Thus, if a look-up of the cache directories for a CFW type I/O request results in a hit, it is believed that such a hit is more likely to result from a successful look-up of the single cache directory 208 specific to the CFW I/O request type, obviating look-ups directed to other cache directories for other I/O request types. As a result, successful look-ups for CFW type I/O requests may frequently be result from a successful look-up of the single cache directory 208, improving the speed of cache look-ups and providing a significant improvement in system performance.

If the look-up of the cache directory 208 (FIG. 2) for CFW type I/O requests is determined (block 436, FIG. 4) to be a hit, that is, it is determined that the cache directory 208 has an entry for the particular track or tracks identified by the track identifier to which the received I/O request is directed, the CFW type I/O request may be performed (block 444, FIG. 4) by directing a read or write operation of the CFW type I/O request to the track or tracks at the cache memory location identified by the entry of the cache directory 208 having the track identifier of the CFW type I/O request from the host. Conversely, if the look-up of the cache directory 208 (FIG. 2) for CFW type I/O requests is determined (block 436, FIG. 4) to be a miss but one of the look-ups directed to the other cache directories 204, 212 (FIG. 2) for other types of I/O requests is determined (block 440, FIG. 4) to be a hit, that is, one of the other cache directories 204, 212 has an entry for the particular track or tracks identified by the track identifier to which the received I/O request is directed, the hit track entry may be moved (block 448, FIG. 4) from the other directory 204, 212 (FIG. 2) and to the cache directory 208 for the I/O request CFW type. In addition, the CFW type I/O request may be performed (block 444, FIG. 4) by directing a read or write operation of the CFW I/O request to the track or tracks at the cache memory location identified by the entry moved to the cache directory 208 having the track identifier of the application I/O request from the host.

If both of the look-ups directed to the other cache directories 204, 212 (FIG. 2) for other types of I/O requests are determined (block 440, FIG. 4) to be a miss, that is, neither of the other cache directories 204, 212 has an entry for the particular track or tracks identified by the track identifier to which the received I/O request is directed, the track or tracks identified by the track identifier of the CFW I/O request may be staged (block 452, FIG. 4) into cache if the CFW I/O request is a read operation or is an update write operation to partially modify preexisting write data stored in storage. In addition, a new entry may be created in the cache directory 208 for the I/O request CFW type, for the track or tracks identified by the CFW I/O request type. Also, the CFW I/O request may be performed (block 444, FIG. 4) by directing a read or write operation of the CFW I/O request to the cache memory location identified by the entry created in the cache directory 208 for the track identifier of the CFW I/O request from the host.

If it is determined that the received read or write I/O request is of the Sync I/O type, a look-up of the cache directory 212 (FIG. 2) for Sync I/O type I/O requests is made to determine (block 456, FIG. 4) if the cache directory 212 has an entry for the particular track or tracks to which the received Sync I/O request is directed. Here too, each entry of the cache directory 212 includes a track identifier and the location of that track in the cache 140 for tracks associated with Sync I/O type I/O requests. By inspecting the hash table for cache directory 212, a determination (block 456, FIG. 4) is made as to whether the cache directory 212 has an entry for the particular track identifier provided by the host, that is whether the look-up encounters a hit, or whether the cache directory 212 lacks an entry for the particular track identifier provided by the host, that is whether the look-up encounters a miss. In those embodiments having a multi-tier cache such as a fast cache tier and a slow cache tier, for example, the hash table for cache sub-directory 212*a* may be inspected and if there is no hit, the hash table for the cache sub-directory 212*b* may be inspected, to determine if the look-up of the cache directory 212 for Sync I/O type I/O requests encounters a hit or a miss.

If the look-up of the cache directory 212 (FIG. 2) for Sync I/O type I/O requests is determined (block 456, FIG. 4) to be a hit, that is, it is determined that the cache directory 212 has an entry for the particular track or tracks identified by the track identifier to which the received I/O request is directed, the Sync I/O type I/O request may be performed (block 466, FIG. 4) by servicing a read operation on a Sync I/O thread, for example, to the track or tracks at the cache memory location identified by the entry of the cache directory 212 having the track identifier of the Sync I/O type I/O request from the host.

Conversely, if the look-up of the cache directory 212 (FIG. 2) for Sync I/O type I/O requests is determined (block 456, FIG. 4) to be a miss, that is, it is determined that the cache directory 212 either lacks an entry for the particular track or tracks to which the received I/O request is directed, or an entry for the particular track or tracks to which the received I/O request is directed was not located in the cache director 212 prior to expiration of a timeout period for the Sync I/O request, the Sync I/O request fails (block 470, FIG. 4) and an appropriate failure notice is returned to the host instead of a completion message. However, by limiting track entries of the cache directory 212 to the specific I/O request Sync I/O type, the size of the cache directory 212 may be reduced as compared to general cache directories for I/O requests of all types, for example. In addition, long collision chains in the hash table for I/O latency jobs like Sync I/O may be reduced. As a result, a look-up of the Sync I/O request type specific cache directory 212 resulting in a successful hit may often be performed more quickly as compared to general cache directories for I/O requests of all types, for example, providing a significant improvement in system performance is provided. In addition, the likelihood of successfully locating in the cache directory 212, an entry for the particular track identifier provided by the host, prior to expiration of a timeout period, may be increased. In this manner, Sync I/O request failures may be reduced, also providing a significant improvement in system performance is provided.

Conversely, if the look-up of the cache directory 212 (FIG. 2) for Sync I/O type I/O requests is determined (block 456, FIG. 4) to be a miss but one of the look-ups directed to the other cache directories 204, 208 (FIG. 2) for other types of I/O requests is determined (block 474, FIG. 4) to be a hit, that is, one of the other cache directories 204, 208 has an entry for the particular track or tracks identified by the track identifier to which the received I/O request is directed, the hit track entry may be moved (block 478, FIG. 4) from the other directory 204, 208 (FIG. 2) and to the cache directory 212 for the I/O request Sync I/O type. In addition, any preprocessing associated with the moved track such as building partial or full track format descriptors, for example, may be performed in advance of the next Sync I/O request directed to that track.

If both of the look-ups directed to the other cache directories 204, 208 (FIG. 2) for other types of I/O requests are determined (block 474, FIG. 4) to be a miss, that is, neither of the other cache directories 204, 208 has an entry for the particular track or tracks identified by the track identifier to which the received I/O request is directed, the track or tracks identified by the track identifier of the Sync I/O request may be staged (block 482, FIG. 4) into cache if the Sync I/O request is a read operation or is an update write operation to partially modify preexisting write data stored in storage. In addition, a new entry may be created in the cache directory 212 for the I/O request Sync I/O type, for the track or tracks identified by the Sync I/O request. Also, any preprocessing associated with the staged track such as building partial or full track format descriptors, for example, may be performed in advance of the next Sync I/O request directed to that track.

In another aspect of Sync I/O request type specific cache directories in accordance with the present description, quickly failing (block 470, FIG. 4) a Sync I/O request that lacks a hit in Sync I/O request type specific cache directory 212 can further improve system performance. For example, if the track has not been staged and lacks proper preprocessing, a quick failure of the Sync I/O directed to that track can improve system performance.

Still further, it is appreciated that I/O requests of the Sync I/O type frequently are directed to a separate set of tracks or volumes as compared to tracks or volumes for other types of I/O requests. Thus, if a look-up of the cache directories for a Sync I/O type I/O request results in a hit, it is believed that such a hit is more likely to result from a successful look-up of the single cache directory 212 specific to the Sync I/O request type, obviating look-ups directed to other cache directories for other I/O request types. As a result, look-ups for Sync I/O type I/O requests may frequently be limited to a look-up of the single cache directory 212, improving the speed of cache look-ups and providing a significant improvement in system performance.

It is appreciated that in some embodiments, the host may issue I/O requests without an associated I/O request type ID which identifies the type of the I/O request being issued to the storage controller by the host. Thus, upon receipt (block 404, FIG. 4) of an I/O request from a host 102 (FIG. 1), if the storage manager 130 determines (block 408, FIG. 4) that the received I/O request is not accompanied by or otherwise associated with an I/O request type ID from the host, the storage manager 130 may in one embodiment, assign a default or assumed I/O request type ID such as an Application I/O type ID, for example. Accordingly, cache directory look-up may proceed on the assumption that the received I/O request is an Application type I/O request and a look-up of the cache directory 204 (FIG. 2) for application type I/O requests is made to determine (block 416, FIG. 4) if the cache directory 204 has an entry for the particular track or tracks to which the received I/O request is directed. In the event that the look-up of the cache directory 204 (FIG. 2) for application type I/O requests is determined (block 416, FIG. 4) to be a miss, that is, the cache directory 204 lacks an entry for the particular track or tracks to which the received I/O request is directed, the other cache directories (such as the cache directories 208, 212 (FIG. 2) may be searched (block 420, FIG. 4) for an entry directed to the particular track identifier. However, should the look-up of the cache directory 204 (FIG. 2) for application type I/O requests is determined (block 416, FIG. 4) to be a hit, that is, the cache directory 204 has an entry for the particular track or tracks identified by the track identifier to which the received I/O request is directed, the received I/O request may be performed (block 424, FIG. 4) by directing a read or write operation of the received I/O request to the track or tracks at the cache memory location identified by the entry of the cache directory 204 having the track identifier of the I/O request received from the host.

Conversely, if the look-up of the cache directory 204 (FIG. 2) for application type I/O requests is determined (block 416, FIG. 4) to be a miss but one of the look-ups directed to the other cache directories 208, 212 (FIG. 2) for other types of I/O requests is determined (block 420, FIG. 4) to be a hit, that is, one of the other cache directories 208, 212 has an entry for the particular track or tracks identified by the track identifier to which the received I/O request is directed, the hit track entry may be moved (block 428, FIG. 4) from the other directory 208, 212 (FIG. 2) and to the cache directory 204 for the I/O request application type. In addition, the received I/O request may be performed (block 424, FIG. 4) by directing a read or write operation of the I/O request to the track or tracks at the cache memory location identified by the entry moved to the cache directory 204 having the track identifier of the I/O request from the host.

If both of the look-ups directed to the other cache directories 208, 212 (FIG. 2) for other types of I/O requests are determined (block 420, FIG. 4) to be a miss, that is, neither of the other cache directories 208, 212 has an entry for the particular track or tracks identified by the track identifier to which the received I/O request is directed, the track or tracks identified by the track identifier of the application I/O request may be staged (block 432, FIG. 4) in to cache if the received I/O request is a read operation or is an update write operation to partially modify preexisting write data stored in storage. In addition, a new entry may be created in the cache directory 204 for the track or tracks identified by the received I/O request. Also, the received I/O request may be performed (block 424, FIG. 4) by directing a read or write operation of the received I/O request to the cache memory location identified by the entry created in the cache directory 204 for the track identifier of the received I/O request from the host.

It is seen from the above that by limiting track entries of a cache directory to a specific I/O request type, the size of the cache directory may be reduced as compared to general cache directories for I/O requests of all types, for example. As a result, a look-up of an I/O request type specific cache directory may often be performed more quickly as compared to general cache directories for I/O requests of all types, for example. In this manner, a significant improvement in system performance is provided.

Furthermore, it is appreciated that I/O requests of a particular type frequently are directed to a separate set of tracks or volumes as compared to tracks or volumes for other types of I/O requests. Thus, if a look-up of a cache directory results in a hit, it is believed that such a hit is more likely to result from a look-up of a single cache directory specific to that I/O request type, obviating look-ups directed to other cache directories for other I/O request types. As a result, look-ups may frequently be limited to a look-up of a single cache directory, improving the speed of cache look-ups and providing a significant improvement in system performance.

Figure 5:
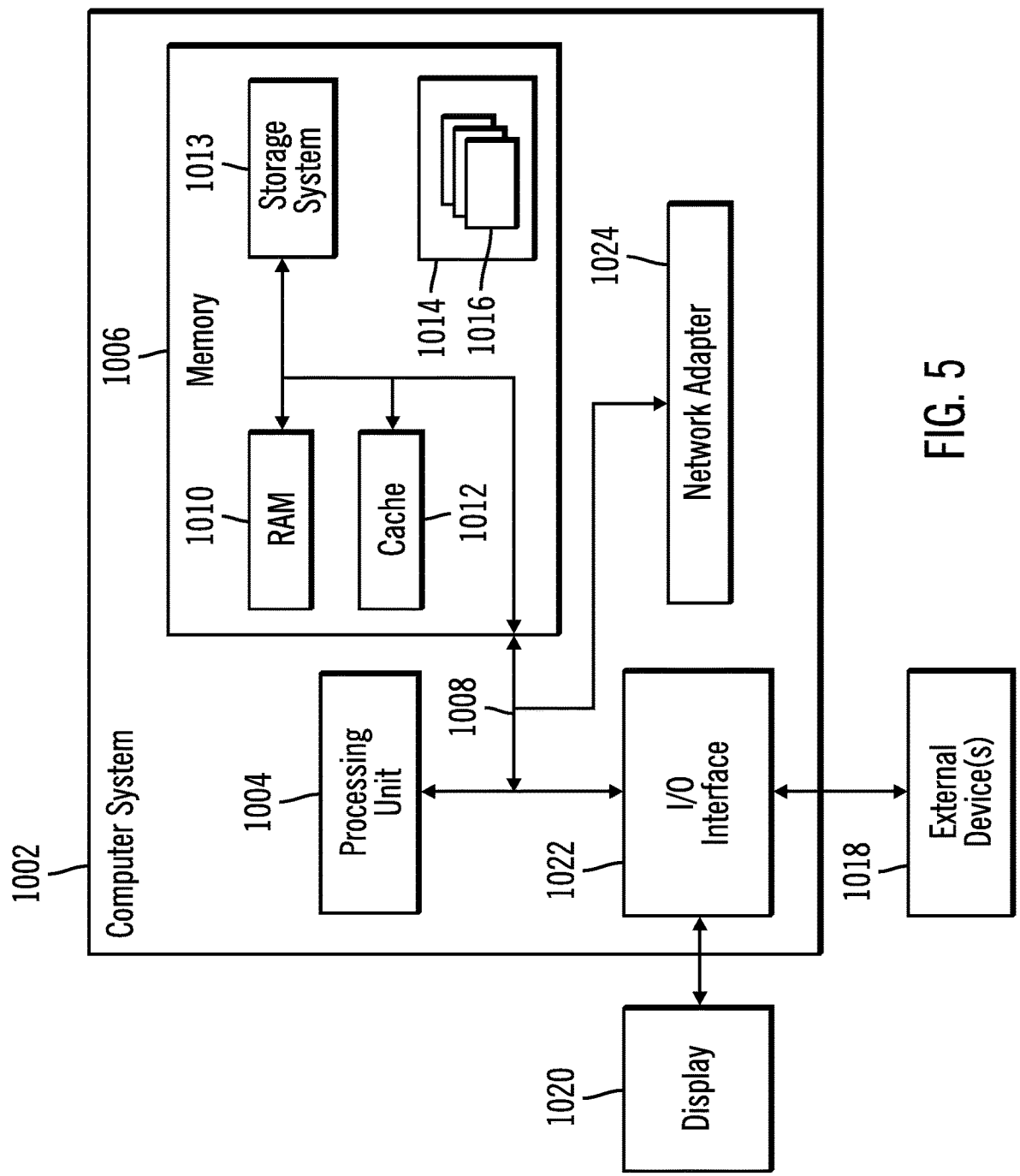
FIG. 5 illustrates, in a block diagram, a computer system employing I/O request type specific cache directories in accordance with certain embodiments.

The computational components of the figures may each be implemented in one or more computer systems, such as the computer system 1002 shown in FIG. 5.

The computer system 1002 may be a computer system, which is operational with numerous other general purpose or special purpose computing system environments or configurations. Examples of well-known computing systems, environments, and/or configurations that may be suitable for use with computer system 1002 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product, the computer program product comprising a computer readable storage medium having program code embodied therewith, the program code executable by at least one processor to perform:
   receiving by a storage controller from a host, a first input/output (I/O) request of a first I/O request type and having a first I/O request type identification (ID) identifying the type of the first I/O request, wherein the first I/O request requests a first I/O operation directed to a first data unit;
   in response to receipt of the first I/O request, selecting a first I/O request type specific cache directory as a function of the first I/O request type ID wherein the first I/O request type specific cache directory indicates whether a particular data unit is stored in the cache and is limited to entries identifying data units cached in the cache for I/O requests of the first I/O request type;
   performing a first look-up for the first data unit in the selected first I/O request type specific cache directory to determine if the first data unit is cached in the cache;
   in response to the first look-up successfully locating a first entry of the first I/O request type specific cache directory identifying the first data unit as cached in the cache, performing the requested first I/O operation of the received first I/O request using the first data unit cached in the cache; and
   in response to the first data unit look-up failing to successfully locate an entry of the first I/O request type specific cache directory identifying the first data unit as cached in the cache, the first I/O request is failed instead of being performed.

2. The computer program product of claim 1, wherein the program code is executable by the at least one processor to further perform:
   in response to the first data unit look-up failing to successfully locate an entry of the first I/O request type specific cache directory identifying the first data unit as cached in the cache, performing a second look-up for the first data unit in a second I/O request type specific cache directory wherein the second I/O request type specific cache directory is limited to entries identifying data units cached in a cache for I/O requests of a second I/O request type.

3. The computer program product of claim 2, wherein the program code is executable by the at least one processor to further perform:
   in response to the second look-up successfully locating an entry of the second I/O request type specific cache directory identifying the first data unit as cached in the cache, moving the successfully located entry of the second I/O request type specific cache directory to the first I/O request type specific cache directory.

4. The computer program product of claim 2, wherein the program code is executable by the at least one processor to further perform:
   in response to the second data unit look-up failing to successfully locate an entry of the second I/O request type specific cache directory identifying the first data unit as cached in the cache, staging the first data unit from storage so that the first data unit is cached into cache, and creating an entry in the first I/O request type specific cache directory for the first data unit.

5. The computer program product of claim 1, wherein the first I/O request is a Sync type I/O request, the first I/O request type ID is a Sync I/O request type ID and the first I/O request type specific cache directory is limited to data units cached in association with I/O requests of the Sync I/O type.

6. A computer system, comprising:
   one or more processors, one or more computer-readable memories including a cache, and one or more computer-readable, tangible storage devices having program code embodied therewith, the program code executable by at least one processor to perform:
   receiving by a storage controller from a host, a first input/output (I/O) request of a first I/O request type and having a first I/O request type identification (ID) identifying the type of the first I/O request, wherein the first I/O request requests a first I/O operation directed to a first data unit;
   in response to receipt of the first I/O request, selecting a first I/O request type specific cache directory as a function of the first I/O request type ID wherein the first I/O request type specific cache directory indicates whether a particular data unit is stored in the cache and is limited to entries identifying data units cached in the cache for I/O requests of the first I/O request type;
   performing a first look-up for the first data unit in the selected first I/O request type specific cache directory to determine if the first data unit is cached in the cache;
   in response to the first look-up successfully locating a first entry of the first I/O request type specific cache directory identifying the first data unit as cached in the cache, performing the requested first I/O operation of the received first I/O request using the first data unit cached in the cache; and
   in response to the first data unit look-up failing to successfully locate an entry of the first I/O request type specific cache directory identifying the first data unit as cached in the cache, the first I/O request is failed instead of being performed.

7. The computer system of claim 6, wherein the program code is executable by the at least one processor to further perform:
   in response to the first data unit look-up failing to successfully locate an entry of the first I/O request type specific cache directory identifying the first data unit as cached in the cache, performing a second look-up for the first data unit in a second I/O request type specific cache directory wherein the second I/O request type specific cache directory is limited to entries identifying data units cached in a cache for I/O requests of a second I/O request type.

8. The computer system of claim 7, wherein the program code is executable by the at least one processor to further perform:

in response to the second look-up successfully locating an entry of the second I/O request type specific cache directory identifying the first data unit as cached in the cache, moving the successfully located entry of the second I/O request type specific cache directory to the first I/O request type specific cache directory.

9. The computer program product of claim 7, wherein the program code is executable by the at least one processor to further perform:

in response to the second data unit look-up failing to successfully locate an entry of the second I/O request type specific cache directory identifying the first data unit as cached in the cache, staging the first data unit from storage so that the first data unit is cached into cache, and creating an entry in the first I/O request type specific cache directory for the first data unit.

10. The computer program product of claim 6, wherein the first I/O request is a Sync type I/O request, the first I/O request type ID is a Sync I/O request type ID and the first I/O request type specific cache directory is limited to data units cached in association with I/O requests of the Sync I/O type.

11. A computer-implemented method, comprising:

receiving by a storage controller from a host, a first input/output (I/O) request of a first I/O request type and having a first I/O request type identification (ID) identifying the type of the first I/O request, wherein the first I/O request requests a first I/O operation directed to a first data unit;

in response to receipt of the first I/O request, selecting a first I/O request type specific cache directory as a function of the first I/O request type ID wherein the first I/O request type specific cache directory indicates whether a particular data unit is stored in the cache and is limited to entries identifying data units cached in the cache for I/O requests of the first I/O request type;

performing a first look-up for the first data unit in the selected first I/O request type specific cache directory to determine if the first data unit is cached in the cache;

in response to the first look-up successfully locating a first entry of the first I/O request type specific cache directory identifying the first data unit as cached in the cache, performing the requested first I/O operation of the received first I/O request using the first data unit cached in the cache; and in response to the first data unit look-up failing to successfully locate an entry of the first I/O request type specific cache directory identifying the first data unit as cached in the cache, the first I/O request is failed instead of being performed.

12. The method of claim 11, further comprising:

in response to the first data unit look-up failing to successfully locate an entry of the first I/O request type specific cache directory identifying the first data unit as cached in the cache, performing a second look-up for the first data unit in a second I/O request type specific cache directory wherein the second I/O request type specific cache directory is limited to entries identifying data units cached in a cache for I/O requests of a second I/O request type.

13. The method of claim 12, further comprising in response to the second look-up successfully locating an entry of the second I/O request type specific cache directory identifying the first data unit as cached in the cache, moving the successfully located entry of the second I/O request type specific cache directory to the first I/O request type specific cache directory.

14. The method of claim 12, further comprising in response to the second data unit look-up failing to successfully locate an entry of the second I/O request type specific cache directory identifying the first data unit as cached in the cache, staging the first data unit from storage so that the first data unit is cached into cache, and creating an entry in the first I/O request type specific cache directory for the first data unit.

15. The method of claim 11 wherein the first I/O request is a sync I/O type I/O request, the first I/O request type ID is a Sync I/O request type ID and the first I/O request type specific cache directory is limited to data units cached in association with I/O requests of the Sync I/O type.

* * * * *